United States Patent [19]

Stephenson

[11] Patent Number: 4,973,988

[45] Date of Patent: Nov. 27, 1990

[54] THERMALLY INTERPOLATIVE THERMAL PRINT HEAD

[75] Inventor: Stanley W. Stephenson, Spencerport, N.Y.

[73] Assignee: Eastman Kodak Company, Rochester, N.Y.

[21] Appl. No.: 418,296

[22] Filed: Oct. 6, 1989

[51] Int. Cl.[5] .............................................. G01D 15/10

[52] U.S. Cl. ................................ 346/76 PH; 219/216

[58] Field of Search .................... 346/76 PH; 219/216

[56] References Cited

U.S. PATENT DOCUMENTS 4,559,542 12/1985 Mita .............................. 346/76 PH 4,723,130 2/1988 Takanashi et al. ............ 346/76 PH

*Primary Examiner*—Bruce A. Reynolds

*Assistant Examiner*—Gerald E. Preston

*Attorney, Agent, or Firm*—Raymond L. Owens

[57] ABSTRACT

A thermal print head having a plurality of heating elements with each element having a central portion and two identical tails. Corresponding tails of adjacent heating elements are aligned and produce an interpolated dye image pixel.

1 Claim, 3 Drawing Sheets

THERMALLY INTERPOLATIVE THERMAL PRINT HEAD

FIELD OF THE INVENTION

The present invention relates to a resistive element array for forming an image using thermally sensitive media.

BACKGROUND OF THE INVENTION

In typical thermal printing mechanisms, a plurality of electrically resistive elements is disposed on an electrically non-conductive substrate. The elements generate heat when an electrical current passes through them by the Joule Heating Effect. This heat energy is used to create dye images using thermally sensitive materials. Each resistive element forms an image pixel using such thermally sensitive or dye donor materials. As shown in FIG. 4, each resistive element has a rectangular shape and is directly connected to a power bus. In one application of the heads, the thermal energy is used to trigger leucocytic dyes in coated paper. This type of media changes density at a rate proportional to applied heat energy. In another application, the energy is used to transfer dye from a thin dye donor web to a dye receiving surface.

In these printing processes, the thermally sensitive media is fed through a nip formed by the head and a rotating platen. The head is pressed firmly against the media. As the drum rotates, the energy to the head is controlled relative to the turning of the drum such that the resistive elements form image pixels of dye on the receiving surface. For black and white text imaging, the pixels are on for sufficient time to ensure complete density change. Further control over the released energy allows for the development of density variation within the image pixel. If the density levels become fine enough, then a virtually continuous tone image can be formed. In color applications, successive patches of color are deposited on to the dye receiving surface to form images of varying hue.

In applications where the image is high resolution (sometimes greater than 1000 pixels in each line), controlling each resistive element directly can create excessive numbers of wire from the head to the controlling mechanism (see FIG. 4). In these applications, the data is transmitted to the head as a serial data stream. In addition, only a predetermined number or set of the resistive elements on the head are energized at any one time so as to reduce the current demand and heat load at the resistive elements. Each of these sets of mutually activatable resistive elements is known as a "group." The heads in these applications contain a series of semiconductor chips that decode the serial data into an on/off signal for each of a set of resistive elements. Typically, several chips are wired together on the head so as to form a group.

The electrical chips used on the heads consist of a serial shift register, a set of latches to capture the data in each of the shift positions, and a semiconductor switching element to energize each resistive element. Typically, a plurality of these chips are mounted on the head. Electrical connection are then made between the connector, the chips and the resistive elements. Currently, each chip typically controls 64 to 128 resistive elements, depending on current load. In a large image application, such as FAX machines with 1728 elements, 27 chips may be needed. Wiring every four chips together produces seven group enables.

Another method that is used to reduce the wire count from the head is to use diodes to matrix decode the data coming into the head. In these heads, the elements are again divided into groups. Each group shares a set of data lines. Diode logic is used to allow the energization of one group at a time. For example, in a 512 element head, every 32 elements could have common data lines, creating 16 groups. The connections from the head would consist of the 32 parallel data lines, the 16 group lines plus an addition six lines, creating about 54 connections. The wire count goes to uncomfortably high levels above 512 elements.

The heating area of the head is built up in layers of materials so as to optimize head performance. The base substrate properties may have several coatings to change the thermal conductivity of the head or to create a raised bead on the head. These layers will typically improve printing performance. After the resistive element is deposited, a very hard anti-abrasion coating is applied to protect the resistors from oxidation and abrasion by the media.

The resistive elements are created using one of two different processes. The first process is a thin film resistor, fabricated by a sputtering or vapor deposition process. Typically, these films are low-resistance, and higher resistances are achieved by using a folded, elongated path resembling a coiled wire to achieve higher resistances. The second resistor manufacturing process, labelled "thick film," screens a slurry of resistive material over the traces. The material is deposited as a line or series of pellets over conductive traces. The processes for creating the resistive elements has steadily improved with the goal of reducing the resistance variations between elements. Recent improvement in the shape and location of the resistive elements has permitted manufacturers to increase the image pixel pitch from 6 and 8 pixels per millimeter to 12 and 16 dots per millimeter.

SUMMARY OF THE INVENTION

Accordingly, it is an object of the invention to improve the cost and/or the resolution of the images printed with resistive element thermal heads above current capabilities.

To achieve this object, a thermal print head has a plurality of resistive elements which are accepted to heat thermally sensitive media to produce dye image pixels, comprising:

(a) each such resistive element having a central portion and two identical tails which extend from opposite sides of the central portion, each tail being aligned with a corresponding tail in an adjacent element and selected to produce about 25% of the total heat produced by its resistive element; and (b) the aligned tails of adjacent resistive elements being selected in size so as to produce an interpolated image pixel having aboout the same area as that produced by the central portion of each adjacent heating element.

Heads made in accordance with this invention can be used to create a low cost printing unit where the digital data is at half typical resolution and the interpolation restores the majority of the lost data. Instead of digitally interpolating the data, then shifting data to the head, the data can be interpolated thermally, halving the number of switching ICs on the head and eliminating the digital interpolation circuitry. Because the ICs make up a large portion of the head's cost, significant cost savings can be affected.

The clock rate for the data to the ICs is a function of gray-level resolution, pixel count and printing speed. When the parameters are all maximized, the required data clock rate is too fast for the ICs. In this case, the new head requires only half the data rate a minimal reduction in image resolution.

DESCRIPTION OF THE PREFERRED EMBODIMENT

Figure 1:
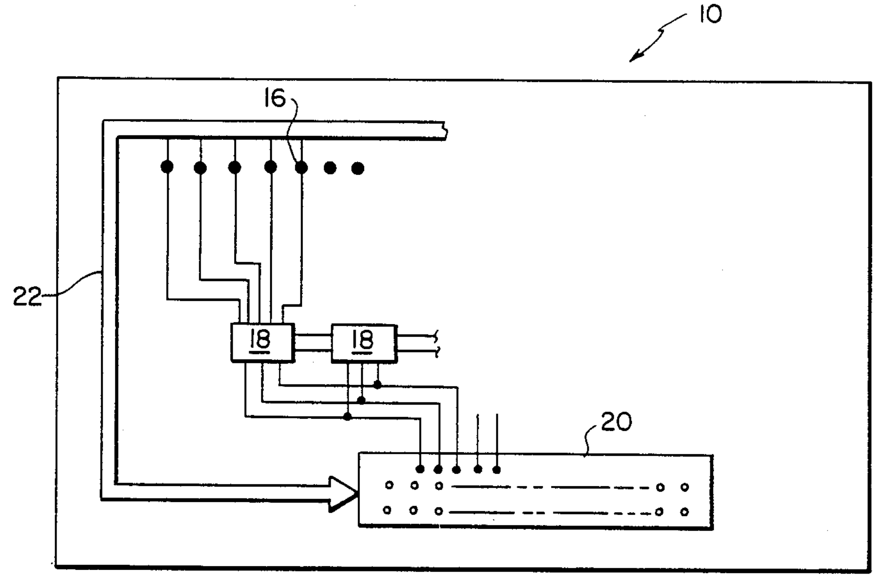
PRIOR ART FIG. 1
FIG. 1 shows typical construction of a conventional thermal print head.
Figure 2:
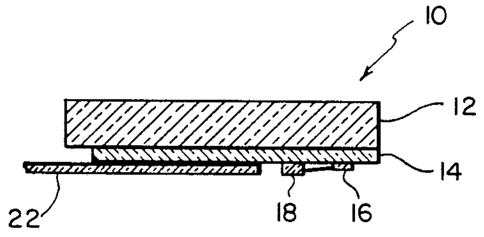
PRIOR ART FIG. 2
FIG. 2 shows a section view of the thermal head of FIG. 1.

Referring to FIGS. 1 and 2 the major structures of a conventional thermal head are shown. The thermal head 10 includes a baseplate 12 supporting a ceramic plate 14 that is attached by adhesive or grout to the baseplate 12. It is important that the attachment between the said baseplate and said ceramic plate be of high thermal conductivity. In the process of printing, the majority of the heat is transferred to said baseplate, which must dissipate the heat.

Figure 5:
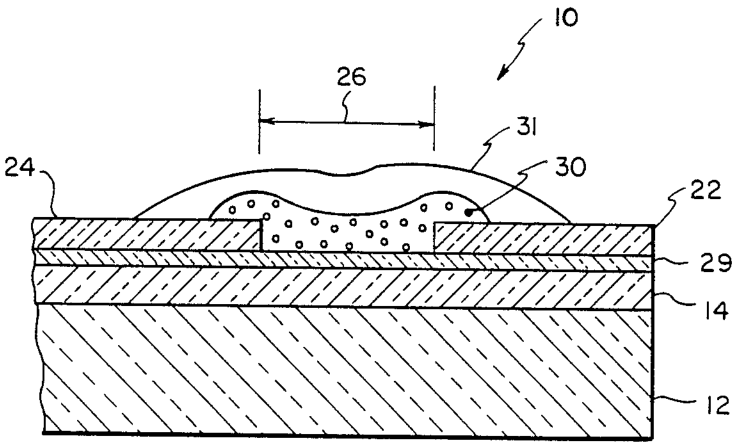
FIG. 5 shows a sectional view through the resistive element of FIG. 4.

Referring to FIG. 5, across section of a resistive element 16 is shown. The resistive element is a composite of several layers, first of which is a thermal coat 29 which provides a smooth surface of the chip (IC) 18. A connector 20 (see FIG. 1) connects a power bus 22 to a source of power (not shown). The thermal coat 29 has optimized thermal properties based on the application and can be shaped so as to raise the resistive element above the rest of the ceramic plate. Raising the resistive element permits an increase in contact force between the resistive element and thermal media.

The power bus 22 is shared in common by all resistors. Individual return lines 24 are deposited on the thermal coating to enable the activation of the resistive element. As shown in FIG. 5, resistive material 30 having a uniform thickness is deposited between a gap 26 left between the power bus and the power return lines 24. The material is either sputtered on to form a "thin-film" head or screened on a a paste for form a "thick-film" head.

Materials for the resistive material consist of the oxides, nitrides or carbides of high melting point metals, such as tantalum, chromium or zirconium or rare earth of such materials as ruthenium. The material will be optimized for minimum property changes under heating and life conditions. These metallic constituents are alloyed with lower conductivity materials to increase sheet resistance.

The resistive material 30 is then covered with an anti-abrasion coating 31 to prevent environmental and wear deterioration of the resistive element 16. The anti-abrasion coating 31 is of minimal thickness and is optimized for hardness and thermal conductivity. Coating 31 can be made of oxides and nitrides of silicon, boron and tantalum.

Figure 3:
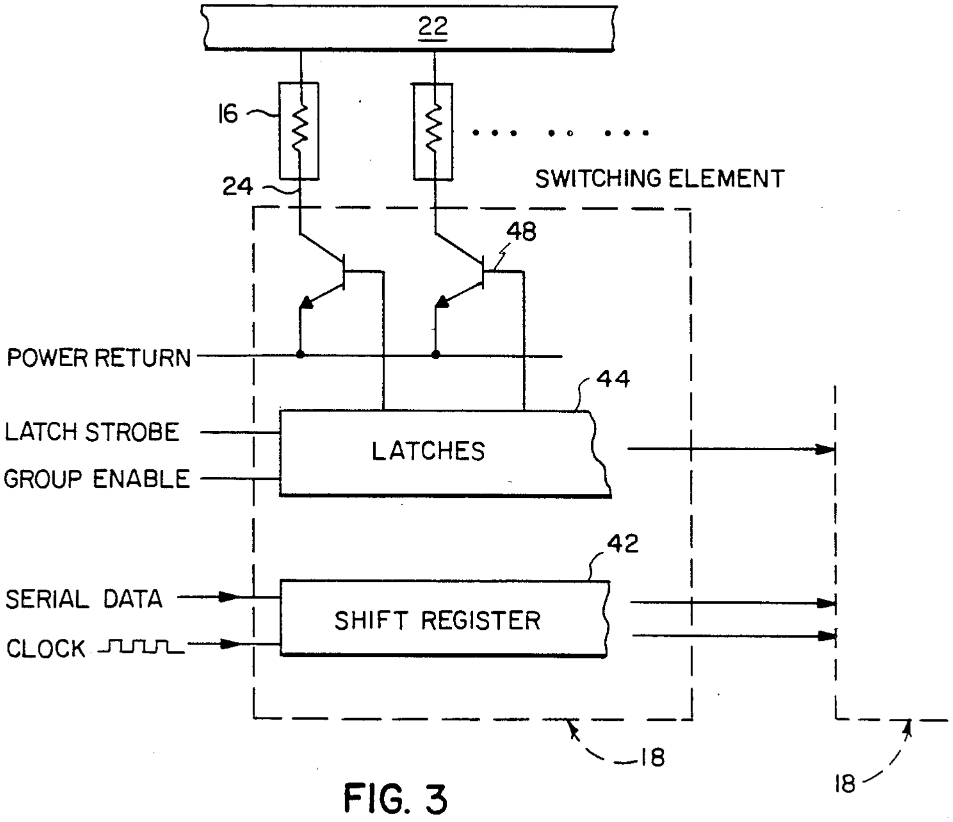
FIG. 3 show the IC control chip of FIG. 1 in more detail.

Referring to FIGS. 1 and 2, the control of the resistive elements is accomplished using control chip 18. Referring to FIG. 3, each chip 18 is composed of three electrical components. In operation, a clock signal shifts serial data into a shift register 42. Serial data line and clock lines are wired so as to allow the data to be shifted through as many chips 18 as are required to control all the resistors on the head. A latch strobe allows the data to be moved from the shift register 42 to latches 44 on the chip. These latches permit the head to be energized and permit the next set of head firing information to be loaded simultaneously with printing. The latches on several chips can be activated by a group enable signal that turns on switching transistor 48 associated with each of said resistive element 16. Power for all resistive elements 16 is provided by power bus 22 that must be of sufficiently high conductivity to allow for maximum peak current load.

Chips 18 are mounted onto the head and the electrical connections are made between the control chips, the resistive elements and the connector 20. The connector 20 can also consist of two or more elements, all such elements allowing for simple connection between the head and the rest of the printing mechanism.

Figure 4:
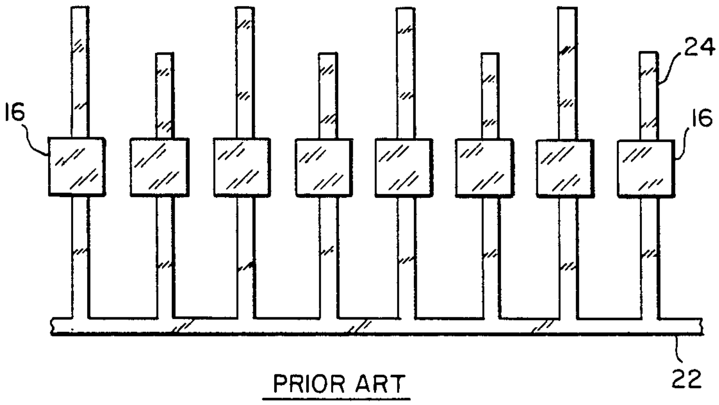
FIG. 4 shows a plan view of the structure of a typical conventional thin film resistive element of FIG. 1.
Figure 6:
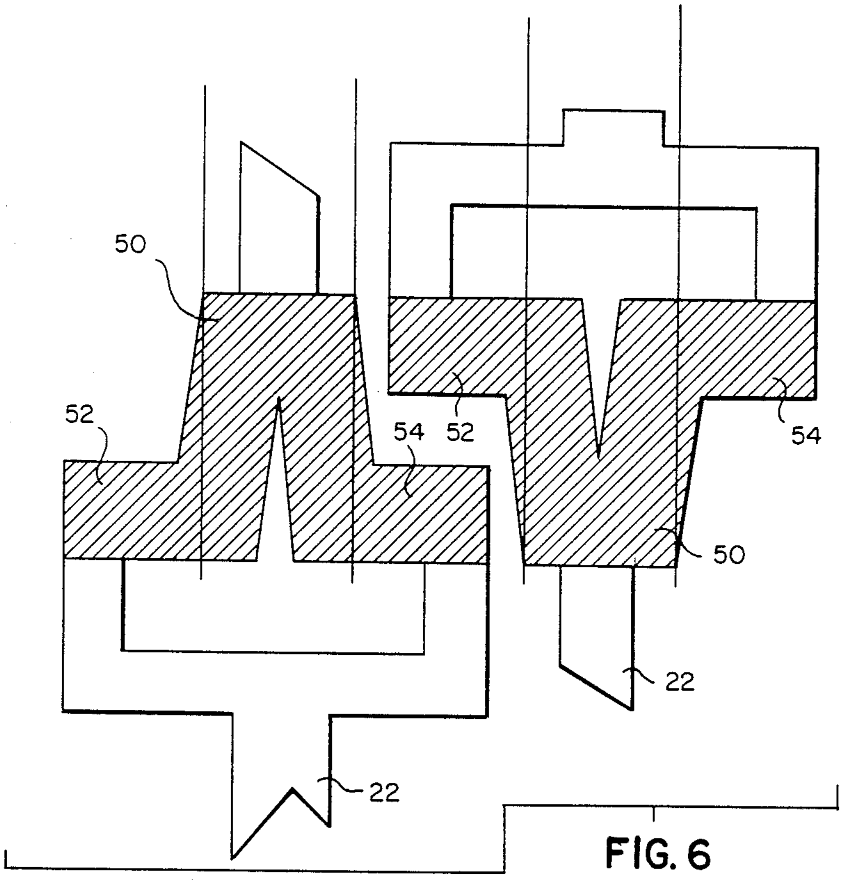
FIG. 6 is a plan view of sensitive elements with aligned tails in accordance with this invention.

The shape of the resistive element varies as a function of the process and materials used in the manufacturing processes. Precise fabrication of this geometry is accomplished by thin film or sputtering technique. Referring to FIG. 4, a typical thick film, rectangular element is shown. FIG. 6 shows the new improved geometry, which shall be called "hat shape" resistive element. A resistive element has been formed so as to have a central portion 50 and two identical tail portions 52 and 54 that contribute energy to "interpolated" pixels. Each tail is aligned witha corresponding tail in an adjacent pixel. In FIG. 4 the right tail 54 of element one is aligned with the left tail 52 of element two. The region of aligned tails is called an interpolated region because when two adjacent tails are heated, an interpolated image pixel is formed by heat from the aligned tails.

The preferred geometry for each resistive element is such that the combined surface area of the two identical side tails are about equal in area to their corresponding central portion. The tails and central portion also have the same thickness. By means of this arrangement the thermal energy is distributed so that 50% of the thermal energy goes to the central portion and 25% of the total thermal energy is distributed into each identical side tail.

The interpolated pixels formed by aligned tails are best adapted to printing mechanism where the speed of the dye media under the head is continuous instead of in discrete steps. A continuous velocity allows the two tails within the interpolated region to "wipe" across the same areas of the media. The result is an overlaying of the two dyes from the tails of two adjacent elements. The arrangement is such that a produced interpolated pixel will have about the same pixel area as that produced by the central portion of each heating element.

Image improvement comes from the fact that resolution of the printed image is approximately twice that of the image data. If the thermal head has 512 resistive elements it will print the 512 image pixels plus 510 interpolated image pixels. Experiments have shown that taking an image of a given resolution and printing the image interpolated at twice resolution results in a high quality image. This new image pixel structure improves the image without the use of digital pre-processing and the use of heads containing a double quantity of control chips. Thermally interpolating the intermediate pixels eliminates digital processing along one axis and halves chip count.

A printer using these heads will have improved resolution along the thermal pixel axis. To complement this improvement in resolution, the digital data can be interpolated in the direction of media travel. This requires a doubling of rate of data transmission to the head. The practical result is a four times doubling of resolution of the image with the use of a single axis digital interpolation.

The invention has been described in detail with particular reference to a certain embodiment thereof, but it will be understood that variations and modifications can be effected within the spirit and scope of the invention.

I claim:

1. In a thermal print head having a plurality of resistive elements arranged in a line which are adapted to heat thermally sensitive media to produce dye image pixels, the improvement comprising:

(a) each such resistive element having a central portion and two identical tails which extend from opposite sides of the central portion, each tail being aligned with a corresponding tail in an adjacent element to heat the same area of the media as its corresponding tail and selected to produce about 25% of the total heat produced by its resistive element; and (b) the aligned tails of adjacent resistive elements being selected in size so as to produce an interpolated image pixel having about the same area as that produced by the central portion of each adjacent heating element.

* * * * *